United States Patent [19]
Zahn et al.

[11] 3,779,837
[45] Dec. 18, 1973

[54] APPARATUS FOR SPLICING EXPOSED PHOTOGRAPHIC FILMS AND FOR ENCODING INFORMATION ON SPLICED-TOGETHER FILMS AND ASSOCIATED ENVELOPES

[75] Inventors: Wolfgang Zahn, Munich; Helmut Zangenfeind, Puchheim; Erich Nagel, Anzing, all of Germany

[73] Assignee: Afga-Gevaert Aktiengesellschaft, Leverkusen, Germany

[22] Filed: June 28, 1972

[21] Appl. No.: 267,171

[30] Foreign Application Priority Data
June 30, 1971 Germany................... P 21 32 573.5

[52] U.S. Cl................ 156/505, 156/159, 156/304, 156/506, 156/545
[51] Int. Cl. .......................................... G03d 15/04
[58] Field of Search................... 156/157, 158, 159, 156/505, 506, 509, 545; 242/58.5

[56] References Cited
UNITED STATES PATENTS
3,687,751   8/1972   Cumbo et al. ...................... 156/64

Primary Examiner—William A. Powell
Assistant Examiner—Brian J. Leitten
Attorney—Michael S. Striker

[57] ABSTRACT

Drop-in cassettes for exposed photographic films and the customer envelopes from which the cassettes were removed are introduced through separate openings into a housing which is sealed against entry of light. The cassettes are moved into the range of a first conveyor system which transports the takeup spools upon removal from the cassettes, and thereupon the films upon unwinding from the takeup spools, along a first path past a splicing and on to an encoding station. The envelopes are transported stepwise and reach the encoding station simultaneously with the associated films to be provided with imprinted or otherwise encoded information which is also applied to splices between successive films. The spliced-together films are transported through a developing and print making apparatus to be thereupon separated from each other and reintroduced into the associated envelopes together with the corresponding prints, prior to being returned to customers or dealers. The number of steps performed by an envelope on its way to the encoding station equals the number of stations along which a cassette, the removed takeup spool and the unwound film move on the way of the film to the encoding station.

25 Claims, 2 Drawing Figures

APPARATUS FOR SPLICING EXPOSED PHOTOGRAPHIC FILMS AND FOR ENCODING INFORMATION ON SPLICED-TOGETHER FILMS AND ASSOCIATED ENVELOPES

BACKGROUND OF THE INVENTION

The present invention relates to improvements in apparatus for splicing exposed photographic films end-to-end. More particularly, the invention relates to improvements in apparatus for splicing together exposed photographic films which are normally stored in containers consisting of synthetic plastic or like material. Still more particularly, the invention relates to improvements in splicing apparatus for photographic films which are further provided with means for encoding information on photographic films prior to, at the same time as or subsequent to splicing, and for simultaneously encoding such information on envelopes which are associated with the films and normally carry additional information pertaining to the customer or dealer in photographic material.

Modern developing plants for photographic films normally employ splicing apparatus which connect a large number of exposed but undeveloped photographic films end-to-end prior to conveying the thus obtained elongated webs or strips through the developing and other stations. Such developing plants receive exposed photographic films from dealers in photographic material and/or other film collecting agencies which in turn receive the films from individual customers, either directly or by mail. It is customary to place each customer film into an envelope and to provide such envelope with information including the name and address of the customer as well as the code number or other information identifying the dealer or collecting agency. The splicing operation is normally performed by resorting to uniting bands which are provided with a suitable adhesive, preferably a heat-activatable adhesive, and which are applied across the abutting ends of successive films so that the thus connected films form an elongated web or strip ready to be transported through a developing machine.

Many types of photographic still cameras utilize photographic film which is stored in a container known as drop-in cassette. The exposed film is normally convoluted around a supply or takeup spool which is rotatable in the casing of the cassette, and the film is normally shielded by a convoluted backing strip consisting of paper or like material. The leader or forward end of the backing strip normally extends beyond the leader of the film so that the code number which identifies the customer who has delivered or mailed the respective container to the dealer or collecting agency cannot be applied directly to the leader of the film. It is therefore customary to apply a label with a code number onto the casing of the container and to identify the corresponding envelope with a similar code number.

In order to avoid a mix-up of customer films, the code number is normally applied to the exposed but undeveloped film prior to introduction of the film into the developing machine. Such operation is rather complex and time-consuming because it must be carried out in a dark chamber for obvious reasons. In accordance with the presently prevailing practice, the label which carries the code number of the customer is removed by a workman in a dark room and is applied to the leader of the respective film after the takeup reel carrying the film and the corresponding backing strip is removed from the casing of the respective container. The label is normally applied to a film portion which was not exposed to scene light. It is also known to expose the code number or other encoded information identifying the customer onto a previously unexposed portion of the respective film. Such identification of exposed films contributes considerably to the cost of the developing and printing.

SUMMARY OF THE INVENTION

An object of the invention is to provide a novel and improved splicing apparatus wherein each of a series of successive customer films can be provided with encoded information pertaining to the respective customer and/or dealer in a fully automatic way with attendant savings in personnel.

Another object of the invention is to provide a splicing apparatus which is capable of automatically removing exposed films from containers of the type known as drop-in cassettes and of automatically providing each film with encoded information simultaneously with the application of similar or identical information to the associated customer or dealer envelopes.

A further object of the invention is to provide the improved apparatus with novel encoding means for exposed photographic films and customer or dealer envelopes, and with novel means for transporting the containers for exposed photographic films, photographic films which are removed from such containers, and customer or dealer envelopes in a predetermined sequence so as to insure that the information which is applied to successive films is also applied to the corresponding envelopes to thus facilitate the introduction of exposed and developed films, as well as of prints which are made from such films, into the respective envelopes for mailing back to the dealer and/or customer.

The invention resides in the provision of an apparatus for splicing end-to-end exposed photographic films which are stored in containers and for providing such films and associated envelopes (which are preferably provided with previously applied information identifying the customer and/or the dealer or film collecting agency) with imprinted numerals or other encoded information. The apparatus comprises first and second conveyor means for respectively transporting a succession of containers (e.g., drop-in cassettes containing supply and takeup spools for convoluted photographic film and a backing strip of paper or the like) along first and second paths, container opening means provided at a first station which is adjacent to the first path and arranged to open successive containers so as to afford access to the films therein, transfer means forming part of the first conveyor means and arranged to transport the thus accessible films independently of the respective containers past at least one additional station which is adjacent to the first path and includes splicing means for connecting the trailing end of each preceding film to the leading end of the next-following film, means (forming part of the second conveyor means) for transporting the envelopes in synchronism with films which are removed from the associated containers, and encoding means which serves to apply related (preferably identical) information to successive films in the first path and to associated envelopes in the second path.

The second conveyor means preferably transports the envelopes in stepwise fashion, and the number of steps completed by each envelope during transport to the encoding means preferably equals the numbers of stations at which a container and the film which was withdrawn from its interior is treated on the way to the encoding device.

The apparatus further preferably comprises scanning, detecting, length measuring and/or analogous means for placing each of a series of successive films into a predetermined position relative to the splicing and encoding means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
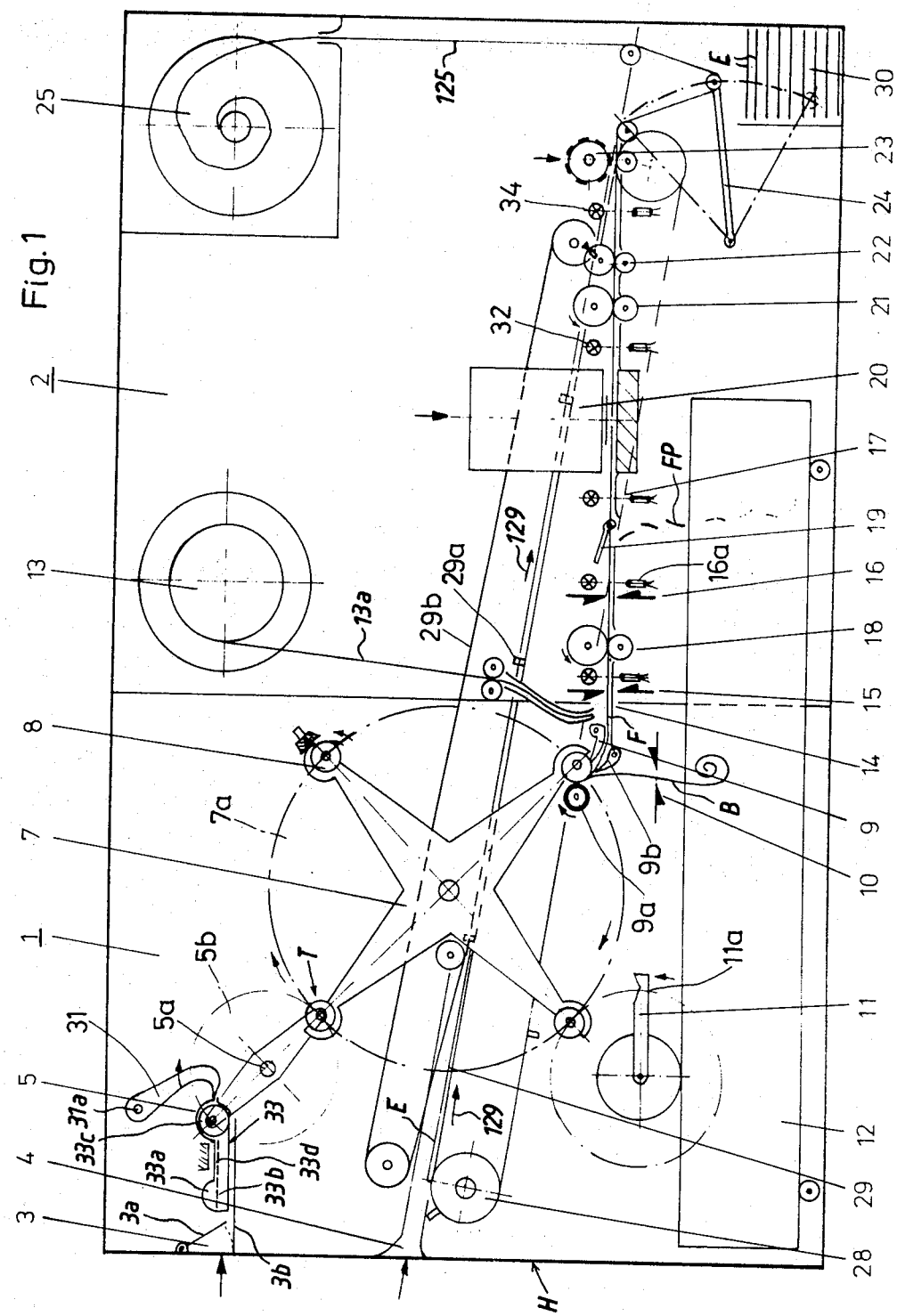
FIG. 1 is a schematic vertical sectional view of an apparatus which embodies the invention.

The drawing illustrates a splicing and encoding apparatus for photographic films and associated envelopes. The apparatus comprises a housing H which is sealed against entry of light and comprises a first opening 3 provided in one of the side walls and serving for admission of successive containers 33 of the type known as drop-in cassettes. The same side wall of the housing H is further provided with a second opening 4 which is preferably located at a level below the opening 3 and serves for admission of envelopes E each of which is associated with one of the containers 33. Thus, an envelope E which is delivered to a developing or processing laboratory by a dealer or collecting agency for exposed photographic films already accommodates a container 33 at the time when it is received by the collecting agency or dealer, or such a container is introduced into an envelope E at the time when it is delivered to the dealer or agency. The dealer or agency mails or delivers the envelopes E, each containing a container 33, to the processing laboratory which utilizes the apparatus of the present invention.

The apparatus comprises two main units which are accommodated in the interior of the housing H. These units include a film removing unit 1 and a combined splicing and encoding unit 2. The apparatus further comprises two discrete conveyor systems one of which serves for transport of containers 33 and of exposed but undeveloped films which are removed from such ontainers along a first predetermined path, and the other of which serves for intermittent transport of successive envelopes E. The container admitting opening 3 is preferably provided with a flap 3a automatically tending to assume a position in which it is located in a substantially vertical plane and thus prevents entry of light by way of the opening 3. The attendant in charge of the apparatus removes a container 33 from its envelope E and pushes the thus removed container through the opening 3 along a platform 3b whereby the forward end of the container displaces the flap 3a which thereupon automatically reassumes its closed position. The corresponding envelopes E is inserted through the opening 4. Each container 33 comprises a casing which preferably consists of synthetic plastic material and includes an upper section or shell 33a and a lower section or shell 33b. The casing includes a front end portion which accommodates a takeup reel 33c and a rear portion which accommodates a supply reel, not shown. The axes of supply and takeup reels in a container on the platform 3b are located in a common plane. Still further, the casing includes an intermediate portion 33d which is provided with a customary light-admitting window 33e (see FIG. 2) through which the scene light can reach the foremost unexposed film frame when the container 33 is installed in a photographic apparatus. The container 33 should be inserted into the opening 3 in such a way that the takeup reel 33c located at its front end and that the window 33e in the intermediate portion 33d faces upwardly. The introduction of a container 33 into the housing H is completed when its front portion abuts against a suitable step here shown as a container-opening tool 31 which is pivotable about a horizontal shaft 31a.

Each envelope E which is inserted into the housing H by way of the opening 4 is preferably provided with information which pertains to the customer and/or dealer or collecting agency. For example, each envelope E can be provided with the name and address of the customer as well as with the address, name and/or code number of the dealer or collecting agency. The conveyor system for the envelopes E includes an endless conveyor belt 29 the upper stretch of which is inclined downwardly in the direction of lengthwise transport of successive envelopes E (see the arrows 129).

The means 28 (see particularly FIG. 2) for intermittently driving the endless belt 29 comprises a pulley which receives motion from a suitable motor, not shown. The belt 29 is preferably provided with equidistant outwardly extending transverse entraining members 29a which serve to push the envelopes E along the path defined by the upper stretch of the belt 29. The distance between a pair of successive entraining members 29a need not substantially exceed the length of an envelope E. Such spacing of the members 29a insures that the envelopes E are held against appreciable movement relative to the upper stretch of the conveyor belt 29. The conveyor system for the envelopes E further comprises an endless companion conveyor belt 29b the lower stretch of which also advances in the direction indicated by the arrows 129 and which can extend into suitable cutouts in the entraining members 29a so as to define with the upper stretch of the belt 29 a narrow path along which the envelopes E advance toward the encoding station. The conveyor belt 29 is driven by the pulley 28 in stepwise fashion whereby the number of steps performed by the belt 29 in order to move an envelope E from the opening 4 to the encoding station preferably equals the number of stations along which the respective container 33 moves from the opening 3 toward the container 33 moves from the opening 3 toward the container opening station and along which the film which is removed from such container advances from such container opening station to the encoding station. Such stepwise movement of envelopes E in synchronism with movement of the associated containers 33 and films insures that the envelopes E invariably receive information which is identical or related to the information applied to the associated films. The encoding station accommodates an encoding device 23 shown in the lower right-hand portion of FIG. 1.

The container opening tool 31 resembles a hook which is pivotable by pneumatic or hydraulic operating means about the shaft 31a and has a cutting edge capable of penetrating into the front portion of the customary seam between the upper and lower shells 33a, 33b of the container 33 immediately after such container is brought to a stop after having been introduced through and beyond the opening 3. The cutting edge of the tool 31 penetrates into the front end of the seam and thereupon moves the upper shell 33a of the respective container 33 in a direction away from the lower shell 33b to thereby at least partially break the casing of the container so as to afford access to the takeup spool 33c in such container. In order to break open a container 33, the tool 31 must pivot in a clockwise direction, as viewed in FIG. 1. The conveyor system for exposed but undeveloped films F comprises a first transfer device 5 which includes two arms turnable about the axis of a horizontal shaft 5a which can be intermittently driven by a gear 5 b. Each arm or holder of the transfer device 5 is provided with a pair of coaxial pins (see FIG. 2) capable of penetrating into recesses at the axial ends of the takeup spool 33c which has been exposed upon destruction of a container 33 by the tool 31. The pins of each arm or holder of the transfer device 5 are movable by a motor axially toward and away from each other so that they can be introduced into as well as withdrawn from the recesses at the axial ends of a takeup spool 33c therebetween. The holders of the transfer device 5 are thereupon caused to turn in a clockwise direction through an angle of about 180° whereby the loaded holder delivers the freshly removed takeup spool 33c to a transfer station T at which the takeup spool 33c is taken over by one of the four arms or prongs of a second transfer device 7 also forming part of the conveyor system for the films. The transfer device 7 is driven by a second gear 7a which preferably transmits torque to or receives torque from the aforementioned gear 5b. The arrangement may be such that the opening of containers 33 by the tool 31 is only partial, namely, just sufficient to allow the insertion of axially movable pins on a holder of the first transfer device 5 into the partially exposed takeup spool 33c. The extraction of the takeup spool 33c from the partially opened container 33 takes place in automatic response to rotation of the transfer device 5 about the axis of the shaft 5a. During such extraction, the axis of the spool 33c is preferably moved at an angle of about 30 degrees with respect to the common plane of the axes of supply and takeup spools in a container 33 on the platform 3b. The second transfer device 7 is indexed in stepwise fashion so that its prongs move in a clockwise direction, as viewed in FIG. 1. When one of the prongs is located at the transfer station T, the preceeding prong is located at a scanning and orienting station 8, the next preceeding prong is located at an unwinding station 9, and the fourth prong is located at an ejecting station 11. The scanning and orienting station 8 accommodates a device capable of detecting the leader of the backing strip which is convoluted on the takeup spool 33c carried by the respective prong of the transfer device 7. The scanning and orienting station is further provided with means for placing the takeup spool 33c into a predetermined angular position so as to insure proper manipulation of the backing strip and the corresponding exposed but undeveloped film F at the unwinding station 9. The transfer device 7 is indexible through angles of 90°. During each angular movement of the transfer device 7 through 90°, the first transfer device 5 turns through 180°. The ejecting station 11 accommodates a pivotable ejector arm 11a which can remove empty takeup spools 33c from the adjacent prongs of the second transfer device 7 in order to cause the introduction of such empty spools into a collecting receptacle 12 which is preferably mounted on wheels so that it can be periodically withdrawn from the housing H.

The aforementioned means which is provided at the scanning and orienting station 8 and serves to move successively delivered takeup spools 33a to a predetermined angular position preferably includes a means for rotating the takeup spools on the respective pins of the adjacent supporting prong or arm of the transfer device 7. The leader of the backing strip B on the thus rotated takeup spool 33c is moved along a pneumatic detecting device which causes the rotating means to come to a halt at the exact moment when the leader of the backing strip assumes a predetermined position with reference to the axis of the corresponding takeup spool 33c. During transport from the station 8 to the station 9, the angular position of the leader of the backing strip B does not change at all or is changed only to a predetermined extent so that the backing strip leader assumes a predetermined position when it reaches the unwinding station 9. The station 9 accommodates a friction wheel 9a which can be rotated in a direction to unwind the backing strip B from the respective takeup spool 33c. At the same time, a deflector 9b moves against the inner side of the backing strip B and compells the leader of exposed photographic film F on the takeup spool 33c at the unwinding station 9 to move into a channel 14 along which or in which the leader of the film F advances into the nip between two intermittently driven advancing rolls 18 of the conveyor system for exposed films F. The details of mechanisms at the scanning and orienting station 8 and the unwinding station 9 are disclosed in the copending application Ser. No. 252,416, filed May 11, 1972 by Zangenfeind et al., and owned by the assignee of the present application. Reference may be had to this copending application for the exact nature of the parts which orient the leaders of successive backing strips B at the station 8 and unwind the backing strips B and films F at the station 9. As clearly shown in FIG. 1, the backing strip B is caused to descend by gravity into the collecting receptacle 12. An intermittently operated severing device 10 is provided adjacent to the path of successive backing strips 8 from the station 9 into the receptacle 12 to separate the fully unwound backing strips from the respective takeup spools 33c before such spools are transferred to the ejecting station 11. The severing device 10 can be operated intermittently at frequent intervals so as to cut up each backing strip B into a large number of smaller fragments in order to insure that the unwound backing strips cannot interfere with the transport of empty takeup spools 33c toward the ejecting station 11.

The leader of film F which is deflected by the deflector 9b at the unwinding station 9 is caused to advance along a substantially horizontal path and into the nip between the advancing rolls 18 of the first conveyor system. The rolls 18 thereupon advance the film F lengthwise in a direction toward a splicing device 20.

The advancing rolls 18 are followed by an intermittently operating cutting device 16 located immediately ahead of a photoelectric detector 16a including a source of light and a photosensitive element capable of producing signals which serve to actuate the cutting device 16 and the drive for the advancing rolls 18. The light which is furnished by the light source of the detector 16a is preferably in the non-actinic region of the spectrum so as to make sure that it does not expose the film F which is being transported toward the splicing device 20. Alternately, the source of light which forms part of the detector 16a can be turned off immediately after it detects the foremost perforation of the film F in order to insure that such light cannot affect the exposed frames of the adjacent film. The purpose of the detector 16a is to detect the front or foremost perforation on each of a series of successive films F and to thereupon not only arrest the drive for the advancing rolls 18 but also to actuate the cutting device 16 so that the device 16 provides the leading end of the film F with a clean transverse cut such as is best suited for proper splicing of the leading end of the film to the trimmed or cropped trailing end of the preceeding film. It will be noted that the cutting device 16 serves the adjacent film F at a predetermined distance from the foremost perforation of such film. The drive for the advancing rolls 18 is activated when the cutting device 16 completes a servering operation so that the thus trimmed leading end of the film is caused to advance further toward the splicing device 20. The cleanly trimmed foremost end of the film F which extends between the advancing rolls 18 pushes the severed portion FP of the film F against a deflecting member or flap 19 which causes the trimmed-off portion FP to descend by gravity into the receptacle 12. The freshly trimmed front end of the film F which is being advanced by the rolls 18 moves into the range of a second photoelectric detector 17 which arrests the rolls 18 in response to detection of the foremost perforation. The detector 17 is operatively connected with the drive for the advancing rolls 18 so that the trimmed forward end of the film is arrested in a predetermined position with respect to the splicing device 20, namely, in a position in which the trimmed forward end is immediately adjacent to the trimmed trailing end of the preceeding film so that such ends of the two films can be joined by a uniting band. The splicing device 20 receives uniting bands which are obtained in response to severing of a web of uniting band material 26a shown in FIG. 2. Such material is stored on a reel 26 which is driven intermittently in response to a pull on the material 26a by a transporting device 27. The transporting device 27 is followed by a cutter 27a which serves the material 26a at equal intervals so as to furnish the splicing device 20 with a succession of uniting bands each having at least one of its sides coated with a layer of heat-activatable adhesive. The splicing device 20 comprises means for heating such adhesive and means for applying the thus pretreated uniting bands over the adjacent abutting ends of two exposed films F whereby such films are joined end-to-end to form part of a longer web or strip 125 which is convoluted onto the confined core of a takeup reel 25 shown in the upper right-hand portion of FIG. 1. The trimming of the leading and trailing ends of successive films F is preferably such that the distance between the rearmost perforation of the preceding film F and the foremost perforation of the next-following film F is the same as between the perforations of the preceding or next-following film. This insures that the transporting mechanism for the strip or web 125 can properly transport such web to the developing and/or other processing stations.

The distance between the splicing device 20 and a cutting device 15 preferably equals the full length of the useful part of an exposed photographic film F. If the apparatus of the present invention is to be used for treatment of films having different lengths, the effective length of the film path between the cutting device 15 and the splicing device 20 can be changed (either lengthened or shortened) by suitable deflectors or looping devices, not shown. The purpose of the cutting device 15 is to separate the trailing ends of successive films F from the corresponding strips B. The splicing device 20 is followed by a further photoelectric detector 32, by a second pair of advancing rolls 21 which also form part of the conveyor system for the films F, and by a film length measuring device 22. The device 22 is followed by a further photoelectric detector 34 and by the encoding device 23. The detector 34 is preferably located immediately upstream of the encoding device 23. The latter is followed by a looping device or loop former 24 which loops the film that is being transported toward the takeup reel 25 for the web 125.

The discharge end of the conveyor 29 for the envelopes E is located above a receptacle 30 or magazine which serves to intercept the descending imprinted or encoded envelopes E and to automatically stack such envelopes in the same sequence in which the respective films F are spliced together end-to-end to form the web or strip 125.

The apparatus further comprises a reel 13 which carries a supply of film threading strip 13a. The strip 13a can be spliced to the trailing end of the last film F of the web 125. Its purpose is to extend from the mouth of the takeup reel 25 in order to allow for convenient withdrawal of the web 125 from the takeup reel 25 in the developing apparatus proper. Furthermore, the film threading strip 13a can be spliced to the foremost end of the film F which is to form the foremost film of a fresh web 125 so as to facilitate the transport of the foremost film of the fresh web toward the core of the takeup reel 25 when the splicing of films F to form a fresh web 125 is started.

Figure 2:
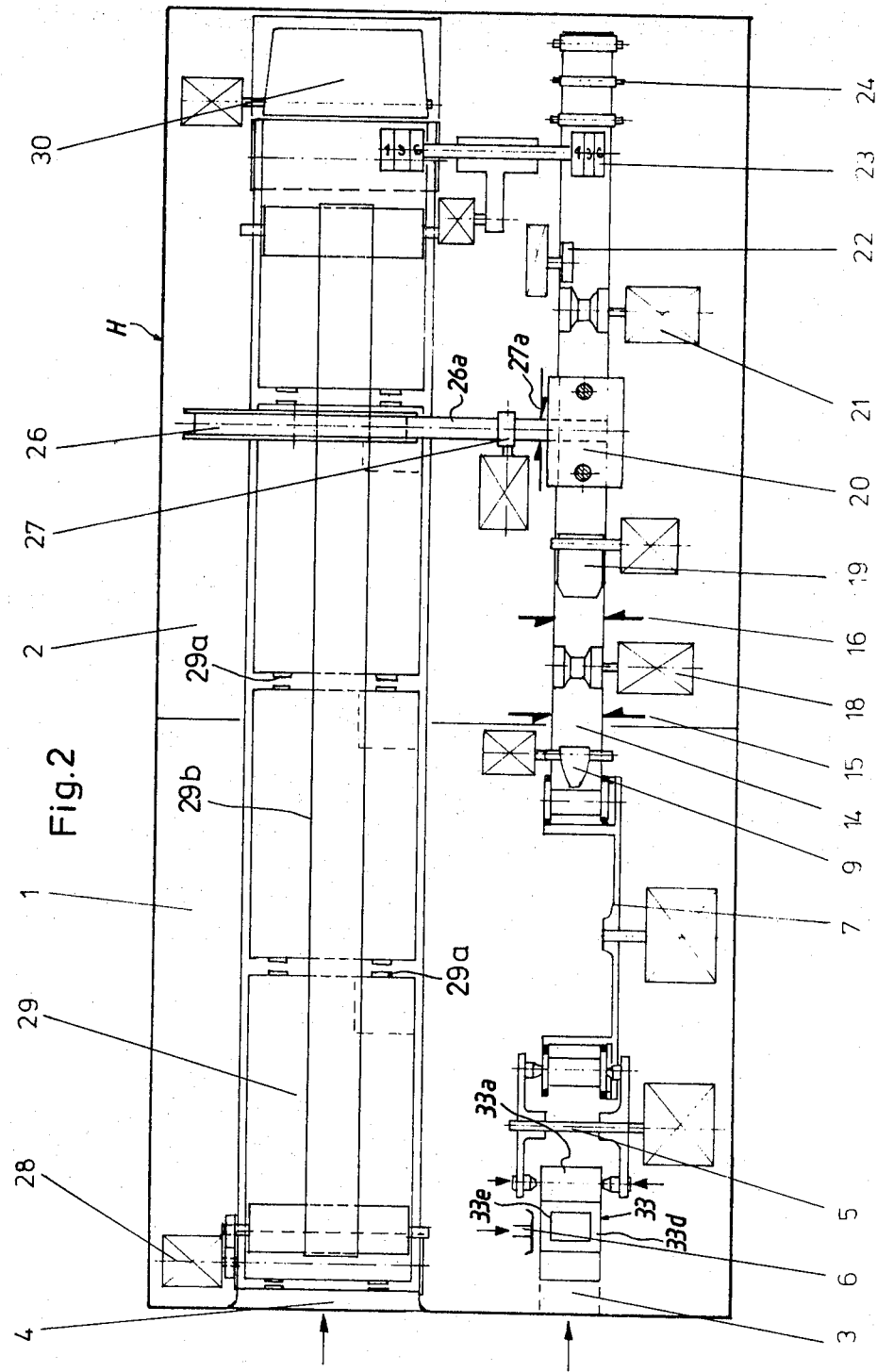
FIG. 2 is a horizontal sectional view of the apparatus shown in FIG. 1.

In the illustrated apparatus the encoding device 23 comprises a printer which applies to the uniting bands between successive films F and to the associated envelopes E successive numerals having more than two (preferably three) digits. Thus, the film F below the uniting band portion which is provided with an imprinted numeral (e.g., 136 as shown in FIG. 2) is associated with the envelope E bearing the same numeral (136). The next film F (and the associated envelope E) is identified by the numeral 137 or 135, and so on. It is clear, however, that the encoding device 23 can be incorporated into or combined with the splicing device 20. For example, each uniting band (obtained in response to severing of the web 26a by the cutter 27a) could constitute a label having two separable sections bearing the same numerals. One section of the label is used for splicing and the other section of the label is applied to the associated envelope E. It is also possible to employ an encoding device which exposes a series of numerals or other symbols onto a previously unexposed portion of the adjacent film and which imprints the same numerals or symbols onto the associated envelope. The encoding device 23 (or an analogous encoding device) can be mounted upstream of the splicing device 20 to encode information on successive envelopes E and on the associated films F as soon as the leading ends of the respective films become accessible. The illustrated mounting of the encoding device 23 behind or downstream of the splicing device 20 is preferably at this time because the spliced-together films F cannot move relative to each other once they have advanced beyond the splicing station. The stepwise transport of envelopes E insures that each envelope is identified in the same way as the associated film F, especially if the number of steps which are completed by an envelope E on its way to the encoding device 23 equals the number of stations for the associated container 33 and film F.

The operation:

An attendant removes a container 33 from its envelope E and inserts the thus removed container into the housing H by way of the opening 3. The envelopes E may be sorted or classified in advance so that each thereof contains a drop-in cassette or container 33 of identical size and/or make. The thus emptied envelope E is inserted into the housing H by way of the opening 4. The insertion of a container 33 and the associated envelope E can automatically trigger the operation of the two conveyor systems, or the attendant actuates a starter button which causes the conveyor belts 29, 29b to advance by a step and which also causes the transfer devices and advancing rolls of the conveyor system for the containers 33 and films F to be set in motion together with the tool 31, friction wheel 9a and other movable parts. The duration of a stage in a complete cycle (namely, a cycle starting with insertion of a container into the housing H and ending with the winding of the respective film F onto the core of the takeup reel 25) depends on the interval of time which is required the longest operation, e.g., the unwinding of a backing strip B and a film F at the station 9. During the first stage of a cycle, the tool 31 breaks open a fresh container 33 and the adjacent holder of the first transfer device 5 extracts the thus exposed takeup spool 33c for delivery to the transfer station T. The spool 33c at the station T remains idle until the start of the next stage which results in delivery of such spool to the scanning and orienting station 8. The conveyor belt 29 completes a step in response to each stepwise movement of a container 33, the respective spool 33c or the respective film F. The empty container 33 which has been relieved of its takeup spool 33c is removed from the platform 3b by a transfer member or pusher 6 so that it can descend into the receptacle 12.

The attendant inserts a fresh container 33 and a fresh envelope E when the spool 33c which was removed from one of the preceding containers reaches the combined scanning and orienting station 8. The mechanism at this station rotates the spool 33c in a direction to collect the film F and the backing strip B (refer to the aforementioned copening application of Zangenfeind et al.) and arrests the takeup spool when the leader of the strip B assumes a predetermined position. The thus oriented takeup spool 33c is thereupon transported to the unwinding station 9 and the wheel 9a is set in motion to rotate the spool in a direction to pay out the strip B and the associated film F. The leader of the backing strip B is caused to descend ahead of the deflector 9b while the latter directs the leader of the film F into the channel 14 for movement into the range of the advancing rolls 18. The cutting device 16 trims the leader of the film F when the photoelectric device 16a detects the foremost perforation and while the advancing rolls 18 are at a standstill. The advancing rolls 18 thereupon move the trimmed leader of the film F into the splicing station so that the leader is adjacent to the trimmed trailing end of the preceding film F. The cutting device 15 severs the film F which is being severed by the cutting device 16 so that the film is separated from the corresponding backing strip B. The latter is severed by the device 10 so that it descends into the receptacle 12. The empty takeup spool 33c is moved to the station 11 and is separated from the respective prong of the transfer device 7 by the ejector arm 11a. When a spool 33a reaches the ejecting station 11, an envelope E reaches the encoding device 23 in response to a stepwise advance of the conveyor belt 29. The envelope E reaches the splicing device 23 simultaneously with the associated film F whose movement is controlled by the film length measuring device 22 and the photoelectric detector 34. The devices 22 and 34 insure that a duplicate of the numeral which is applied to an envelope E is invariably applied to a predetermined portion of the associated film F in order to allow for evaluation of the thus encoded information by an automatic reader (not shown) which facilitates the reintroduction of films into corresponding envelopes upon completion of the developing and/or printing operation. As mentioned above, the encoding device 23 may be designed to apply numerals or other information to successive uniting bands which are applied to the web 125 by the splicing device 20.

The web 125 is preferably convoluted onto the concealed core of the takeup reel 25 in stepwise fashion. The overall length of the film F which is being convoluted onto the core of the reel 25 is measured by the device 22 in combination with the detector 32 which detects the last perforation of the film to arrest its trailing end in an optimum position for splicing to the trimmed leading end of the next-following film F. The just described cycle is then repeated with the next films F until the web 125 reaches a desired length. Whenever the leading end of a film F reaches the splicing station and the leading end of the preceding film F reaches the encoding station, a freshly encoded envelope E advances beyond the discharge end of the conveyor belt 29 and descends into the magazine 30. The magazine 30 accumulates a stack of successive envelopes E in the same sequence in which the associated films F are united end-to-end to form a web 125. A visual inspection can be carried out at any time since the numerals on successive splices are or must be identical with the numerals on successive envelopes which are removed from the magazine 30.

The web 125 is thereupon caused to advance through a developing machine (not shown) and, if necessary, through a copying machine which makes one or more prints from selected or successive frames of the web 125. The copies are thereupon introduced into the corresponding encoded envelopes E, together with the associated films which are obtained upon severing of the web 125. The thus encoded and filled envelopes are returned to the dealers or film collecting agencies to be forwarded to or picked up by the customers. As mentioned above, each envelope E is provided with information identifying the customer not later than when the envelope is introduced into the housing H by way of the opening 4. This reduces the likelihood of a mixup at the shop of the dealer or collecting agency. The introduction of prints and/or developed films into the associated envelopes E can be carried out by hand or by resorting to an automatic or semiautomatic filling apparatus.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and described to be protected by Letters Patent is set forth in the appended claims:

1. Apparatus for splicing end-to-end exposed photographic films which are stored in containers and for providing such films and associated envelopes with encoded information, comprising first and second conveyor means for respectively transporting a succession of containers and a succession of associated envelopes along first and second path; container opening means provided at a first station adjacent to said first path and arranged to open successive containers so as to afford access to the film therein, said first conveyor means including transfer means arranged to transport the thus accessible films past at least one additional station adjacent to said first path and including splicing means for connecting the trailing end of each preceding film with the leading end of the next-following film, said second conveyor means including means for transporting the envelopes in synchronism with films which are removed from the associated containers; an encoding means arranged to apply related information to successive films in said first path and to associated envelopes in said second path.

2. Apparatus as defined in claim 1, wherein said second conveyor means includes means for transporting the envelopes in stepwise fashion and the number of steps completed by each of said envelopes during transport to said encoding means equals the number of said stations.

3. Apparatus as defined in claim 1, further comprising means for placing predetermined portions of successive films into a predetermined position relative to said encoding means.

4. Apparatus as defined in claim 1, wherein said splicing means includes a source of uniting bands provided with coats of heat-activatable adhesive and means for applying each uniting band to the trailing end of a preceding film and to the leading end of the next-following film in said first path.

5. Apparatus as defined in claim 4, wherein said splicing means is located ahead of said encoding means, as considered in the direction of transport of containers and films along said first path.

6. Apparatus as defined in claim 1, wherein each of said containers comprises a casing including a pair of sections connected to each other by a seam and said container opening means includes a tool actuatable to at least partially separate the sections of successive casings along the respective seams.

7. Apparatus as defined in claim 6, wherein each of said containers further comprises a takeup spool and a supply spool, the films being convoluted around the respective takeup spools and the axes of supply and takeup spools in each of said casings being located in a common plane, said transfer means including holder means for engaging the takeup spools in successively opened casings and to withdraw such spools in a direction substantially at an angle of about 30° to the respective planes.

8. Apparatus as defined in claim 7, wherein said transfer means further comprises a transfer device arranged to receive takeup spools from said holder means and to transport such spools along a predetermined portion of said first path.

9. Apparatus as defined in claim 1, wherein each of said containers comprises a casing containing a takeup spool with the respective film convoluted on such spool, said container opening means including means for opening the casings of successive containers to afford access to the respective spools, said transfer means including a first transfer device having holder means for withdrawing takeup spools from the opened casings of successive containers and a second transfer device for transporting successive spools past four additional stations including a foremost station wherein said second transfer device receives spools from said holder means, a next-following station having means for moving successive spools to a predetermined angular position, a further station including means for unwinding the films from successive spools and an additional station including means for separating successive spools from said second transfer device.

10. Apparatus as defined in claim 9, wherein each of said containers further accommodates a backing strip which is convoluted around the film on the respective takeup spool, said unwinding means including means for directing the leaders of backing strips on successive takeup spools in a predetermined direction.

11. Apparatus as defined in claim 1, wherein each film is provided with a row of perforations and said first conveyor means further comprises advancing means for moving successive films lengthwise, photoelectric detector means for tracking successive films and for temporarily arresting said advancing means in response to detection of foremost perforations on successive films, and cutting means for severing successive films at a predetermined distance from the respective foremost perforations during the periods of idleness of said advancing means.

12. Apparatus as defined in claim 11, wherein said cutting means is located behind said advancing means, as considered in the direction of transport of films along said first path.

13. Apparatus as defined in claim 11, wherein said detector means is operative to actuate said cutting means in response to detection of foremost perforation on successive films.

14. Apparatus as defined in claim 13, further comprising second phtoelectrc detector means located behind said cutting means and arranged to temporarily arrest said advancing means in response to transport of the foremost ends of severed films to a predetermined position relative to said splicing means.

15. Apparatus as defined in claim 14, further comprising second cutting means actuatable to sever successive films at a predetermined distance from said foremost ends thereof while such foremost ends assume said predetermined positions.

16. Apparatus as defined in claim 15, further comprising means for actuating said splicing means simultaneously with said second cutting means.

17. Apparatus as defined in claim 1, further comprising film length measuring means located downstream of said splicing means as considered in the direction of film transport along said first path and arranged to produce signals in response to detection of predetermined lengths of successive films, said first conveyor means further comprising advancing means arranged to transport successive films past said length measuring means and to interrupt such transport of films in response to said signals whereby the trailing end of a film which is engaged by said advancing means while such advancing means is idle is located at said additional station.

18. Apparatus as defined in claim 17, wherein each of said films is provided with a row of perforations and said length measuring means includes means for scanning the perforations on successive films in said first path.

19. Apparatus as defined in claim 1, wherein said second conveyor means comprises an endless flexible conveying element and entraining means provided on said flexible element and arranged to push successive envelopes along said second path.

20. Apparatus as defined in claim 19, wherein said second conveyor means further comprises drive means for intermittently moving said endless flexible conveying element through distances of predetermined length.

21. Apparatus as defined in claim 20, wherein said first conveyor means further comprises means for intermittently driving said transfer means so that such transfer means performs stepwise movements simultaneously with said flexible element.

22. Apparatus as defined in claim 1, wherein said encoding means includes a printing device.

23. Apparatus as defined in claim 22, wherein said printing device includes means for applying successive pairs of numerals to successive films and to successive envelopes.

24. Apparatus as defined in claim 23, wherein each of said numerals has more than two digits.

25. Apparatus as defined in claim 23, wherein said printing device is arranged to apply numerals to splices between successive films.

* * * * *